M. S. DRAKE.

MACHINE FOR POUNCING HATS.

No. 6,858. Reissued Jan. 18, 1876.

Witnesses:

P. C. Dieterich

P. H. Duffy

Inventor:

Marlon S. Drake

Per: C. H. Watson & Co. Attorneys.

UNITED STATES PATENT OFFICE.

MAHLON S. DRAKE, OF NEWARK, NEW JERSEY. ASSIGNOR, BY MESNE ASSIGNMENTS, TO HENRY M. YATES AND YATES, WHARTON & CO.

IMPROVEMENT IN MACHINES FOR POUNCING HATS.

Specification forming part of Letters Patent No. 61,814, dated February 5, 1867; reissue No. 6,858, dated January 18, 1876; application filed December 24, 1875.

*To all whom it may concern:*

Be it known that I, MAHLON S. DRAKE, of Newark, in the county of Essex and State of New Jersey, have invented certain new and useful Improvements in Machines for Pouncing Hats; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of my invention consists in the construction and arrangement of a machine for pouncing hats, as will be hereinafter more fully set forth.

Figure 1:
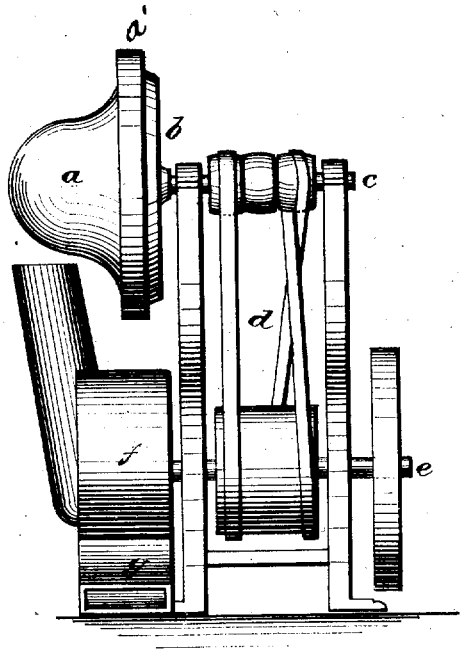
Figure 3:
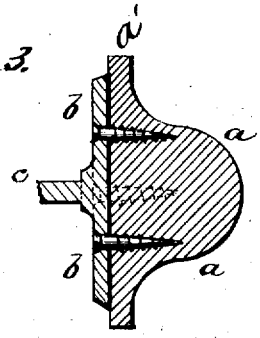
Figure 2:
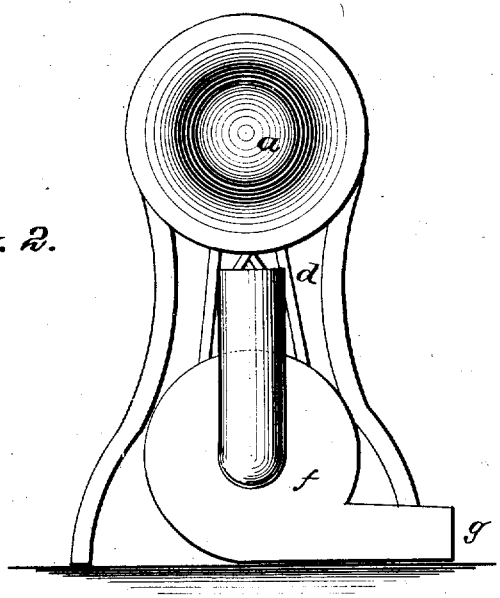

In the annexed drawing, Figure 1 is a side elevation of my machine. Fig. 2 is a front view of the same. Fig. 3 is a section through the hat-block.

*a* represents the hat-block, which is formed in that combined concave and convex shape commonly termed "ogee," that being the best possible shape for having all parts of the hat equally tight and smooth under the hands of the operator. At the base of the block *a* is formed a circumferential flange, *a'*, which constitutes the brim-board. This combined hat-block and brim-board is attached, by screws or otherwise, to a face-plate, *b*, on the end of a mandrel, *c*, to which motion is given by belts, as shown, with two loose pulleys, and one fast to the mandrel, the reverse motion being obtained by means of a cross-belt, *d*, or any other suitable means that will answer the same purpose. On the end of the driving-shaft *e* is placed a fan blower, *f*, which collects the dust and fur as they are rubbed from the hat, and ejects them at *g* into any suitable receiver.

Having thus fully described my invention, what I claim as new, and desire to secure by Letters Patent, is—

1. The hat-block *a*, made in ogee form, and provided at its base with a circumferential projecting flange, *a'*, forming the brim-board, substantially as herein set forth.

2. The combination of the combined block and board *a a'*, face-plate *b*, mandrel *c*, pulleys and belts, and driving-shaft *e*, all substantially as herein set forth.

3. The combination, in a hat-pouncing machine, of the revolving block and board *a a'* and the rotary fan-blower *f*, substantially as and for the purposes herein set forth.

In testimony that I claim the foregoing I have hereunto set my hand this 21st day of December, 1875.

MAHLON S. DRAKE.

Witnesses:

C. H. WATSON,

HENRY M. YATES.